June 26, 1951  C. O. BJORK  2,558,668
COFFEE MAKER
Filed Aug. 8, 1949

CARL O. BJORK,
INVENTOR.

BY James M. Abbett
ATTORNEY

Patented June 26, 1951

2,558,668

UNITED STATES PATENT OFFICE 2,558,668

COFFEE MAKER

Carl O. Bjork, Wilmington, Calif.

Application August 8, 1949, Serial No. 109,195

3 Claims. (Cl. 99—299)

This invention relates to cooking utensils, and particularly relates to coffee makers, and is a continuation in part of my application entitled "Coffee Maker," Serial No. 775,547, filed September 22, 1947, now abandoned.

At the present time various devices have been made for home use in brewing coffee, one of the popular methods being by the drip process. In such a process two vessels are provided, the upper one carrying coffee and water and the lower one receiving the liquid from the upper vessel as it drips through a filtering member therebetween after the coffee has been brewed. In this method there is considerable difficulty due to the fact that there is no way to prevent the flow of water to the lower vessel immediately after it has been poured into the upper vessel, and thus a portion of the liquid in the lower vessel does not represent brewed coffee. Furthermore, there is no way to control the rate of flow of liquid from the upper vessel nor the consequent clogging of the filtering member by coffee grounds entrained by rapidly flowing liquid. It is desirable therefore to provide means whereby coffee may be brewed by the drip method in a manner to insure that the coffee and the water may be retained in contact with each other during a specific period before the coffee is released from the upper vessel to thereby definitely establish the strength of the coffee, and which structure makes it possible to control the rate of flow of the liquid from the upper vessel to the lower vessel. In the present embodiment of the invention a valve structure is provided which supports the coffee in the upper vessel in free contact with the water but out of the path of liquid flow to the lower vessel so as to minimize entrainment of coffee grounds. The invention also provides timing means by which the period of contact between the water and coffee in the upper vessel may be gauged so as to insure uniformity between successive brews.

The invention is illustrated by way of example in the accompanying drawings in which.

Figure 1:
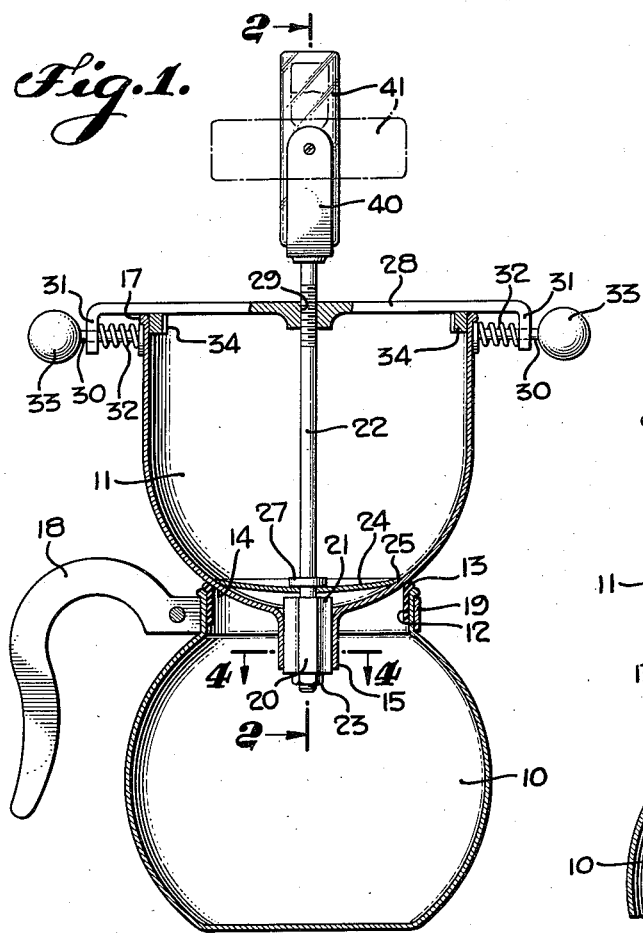
Figure 1 is a view in central vertical section showing the complete coffee maker.

Referring more particularly to the drawing, 10 indicates a lower vessel within which the brewed coffee is accumulated, and 11 indicates an upper vessel adapted to be mounted on the vessel 10 and which receives the coffee and the water. The lower vessel 10 is formed with a relatively large mouth 12, provided with a packing ring 13 upon which the lower surface 14 of the upper vessel 11 rests and against which the surface 14 is sealed. It will be understood that the upper vessel, as well as the lower vessel, may be made of glass. Centrally of the lower surface 14 of the upper vessel 11 there is provided a neck 15 adapted to extend into the lower vessel, which neck circumscribes a drain opening 16 by which liquid from the upper vessel 11 is delivered to the lower vessel 10. The top of the upper vessel 11 is open and formed with a circumferential bead 17, the open top providing easy access for the supply of water and coffee to the upper vessel. Either or both of the vessels 10 and 11 may be provided with suitable handles, such as the handle 18 carried by the band 19 encircling the mouth of the lower vessel 10.

Removably located within the drain opening 16 of the neck 15 of the upper vessel 11 there is provided a centering member in the form of an elongated head 20 of generally cylindrical form, the sides of which are fluted as at 21 to form restricted vertical passages between the head 20 and the inner walls of the opening 16. The brewed coffee is admitted to the lower vessel from the upper vessel by passage through these openings. The head 20 is mounted upon a vertically disposed rod 22 being secured adjacent the end thereof by a nut 23. The rod 22 also supports and carries a valve disk 24 which is formed of slightly flexible imperforate material and is mounted freely on the rod 22 coaxially therewith. The circumference of the disk 24 is formed equal to the cross-section of the inner surface of the upper vessel 11 at the plane of the top of the head 20 when the rod 22 is in the position shown in Fig. 2. In such position the edges 25 of the disk 24 will rest against the sides of the upper vessel. The disk valve 24 is loosely mounted upon the rod 22, longitudinal movement thereover being restrained in downward direction by the upper surface of the head 20 and in upper direction by a stop flange 27 mounted on the rod in spaced relation to the upper surface of the head. The rod 22 is removably supported in central vertical position within the upper vessel 11 by a removable cross-head 28 provided with a central threaded aperture 29 through which the rod 22 extends and may be vertically adjusted upon rotation of the rod with respect to the cross-head. The cross-head 28 is removably supported by the upper rim of the upper vessel 11 and may be removably retained in position thereon by radially movable retainers 30 which project through downwardly turned terminal ends 31 of the cross-head. The inner ends of the retainers 30 are adapted to be received under the bead 17 of the mouth of the upper vessel to retain the cross-head in position and are normally urged to such inner position by springs 32, retraction against the tension of the springs being provided by handles 33. Accurate centering of the cross-head with respect to the upper vessel is insured by the provision of depending spacing lips 34 which engage the opposite inner sides of the upper vessel.

Figure 2:
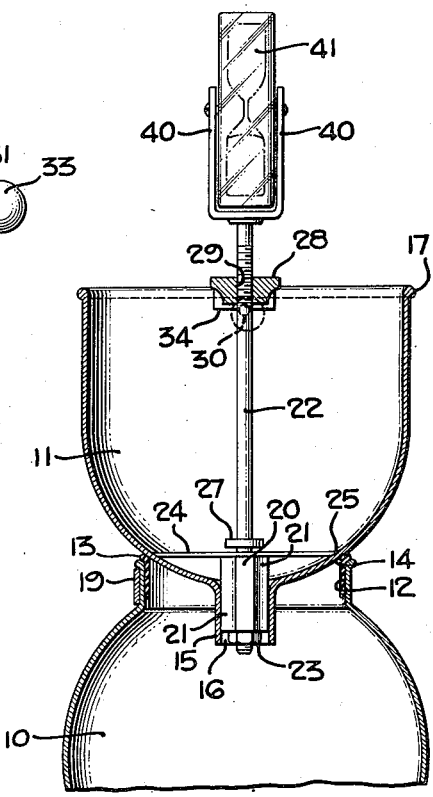
Fig. 2 is a fragmentary view in vertical section as seen on the line 2—2 of Fig. 1.
Figure 3:
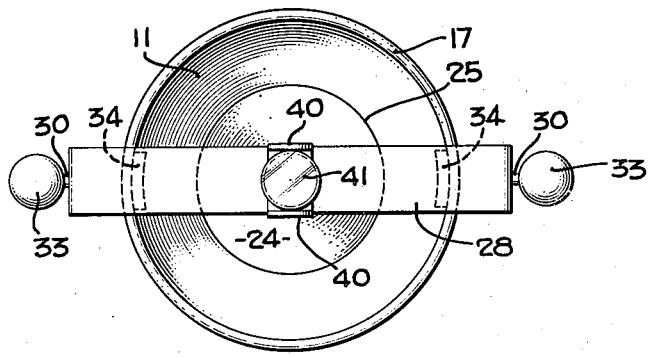
Fig. 3 is a top plan view of the device as seen in Fig. 1.
Figure 4:
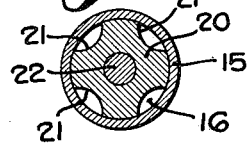
Fig. 4 is a transverse sectional view through the filter centering device as seen on the line 4—4 of Fig. 1.

It will be seen that with the parts assembled as shown in Fig. 2 coffee and water may be supplied to the upper vessel and will be retained therein, the disk valve closing the lower portion of the upper vessel and precluding passage of the brewed coffee to the drain 16 and therethrough to the lower vessel 10. If desired, leakage of brewed coffee past the edges 25 of the disk may be precluded by downward threaded adjustment of the rod through the cross-head so as to flex the disk valve, as indicated in Fig. 1, forcing the edges tightly against the inner surface of the vessel. When the water has been retained in the upper vessel in contact with the coffee a desired time the disk may be raised to break its seal with the walls of the vessel by an upward threaded adjustment of the rod with respect to the cross-head. Upon such upward adjustment of the rod the head 20 will lift the disk to space its edges from the walls of the vessel permitting the brewed coffee to pass the edges 25 and filter through the passages 21 into the lower vessel 10. It will of course be noted that the lifting of the disk is gradual, and that the spacing of its edges 25 with respect to the walls of the vessel may be accurately regulated to regulate the rate of flow of the brewed coffee from the upper vessel to the lower one. It will also be noted that the disk will support the coffee and that by rotation of the rod 22, the disk 24 may be spaced upwardly such a precise distance from the hemispherical bottom of the vessel 11 as to allow the brew to escape downward readily past the disk and yet restrain the grounds from escaping with the brew.

As a means for threadedly adjusting the rod 22 and regulating the length of time of contact of the water with the coffee in the upper vessel the upper protruding end of the rod 22 is provided with a bifurcated extension, the furcations 40 of which support therebetween a pivotally mounted hour-glass type of timer, indicated at 41. The casing of the timer 41 is of course transparent so that an observer may note the gradual passage of sand or like material from one compartment to the other and thus accurately judge the duration of the brewing period.

It will thus be seen that the coffee maker here disclosed is decidedly simple in construction, and that its parts may be maintained easily in a sanitary condition, and that by proper manipulation of the coffee maker coffee of a uniform strength may be repeatedly produced whenever the coffee maker is used. It is to be understood that the parts of the present device may be of metal, glass or any other suitable material.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A coffee maker comprising in combination: a lower vessel; an upper vessel supported thereon and having a narrow guide neck at the center of the lower end thereof; a cross member mounted on said upper vessel at its upper end; a central rod adjustably mounted on said cross member for vertical movement; a guide member provided on the lower end of said rod and slideable vertically in said neck; a shoulder provided on said rod a short distance above said member; a flexible disk centrally penetrated by and slideable on said rod between said member and said shoulder, the outer edge of said disk being adapted to rest on the bottom of said upper vessel, said bottom sloping outwardly and upwardly at an angle of approximately forty degrees with horizontal in the annular area just outward from the edge of said disk; and threaded means for optionally lowering said rod to press said disk against said upper vessel's bottom or to lift said disk a slight distance above said bottom.

2. A coffee maker comprising in combination: a lower vessel; an upper vessel supported thereon and having a hemispherical bottom terminating in a narrow guide neck at the center thereof; a cross member mounted on the upper end of said upper vessel; a central vertical rod adjustably mounted on said cross member for vertical movement, the lower end of said rod being slideably guided by said neck; and a flexible disk concentric with said rod and mounted thereon just above said guide neck, the outer edge of said disk being adapted to rest on said bottom of said upper vessel with said disk disposed close to the juncture of said neck with said vessel bottom; and threaded means for lowering said rod to press said disk against said vessel bottom and to raise said disk into slightly spaced relation with said bottom at will.

3. In combination: a coffee brewing vessel having a substantially hemispherical bottom, a cross member mounted on the upper end of said vessel; a rod mounted for vertical adjustment on said cross member in axial relation with said vessel; means disposed centrally of said vessel bottom for guiding said rod; a flexible disk provided on said rod and adapted to rest on a central portion of said bottom; and threaded means for optionally moving said rod downwardly to apply pressure to said disk to form a seal preventing an escape of liquid downwardly from said vessel or to lift said disk to provide a relatively narrow opening between said disk and said vessel bottom for the escape of liquid from said vessel downwardly about said disk, a passageway being formed beneath said disk for the downward escape of liquid by-passing said disk.

CARL O. BJORK.

REFERENCES CITED

The following references are of record in the file of this patent:

UNITED STATES PATENTS

| Number | Name | Date |
|---|---|---|
| 49,062 | Ashley | Aug. 1, 1865 |
| 246,785 | Kappner | Sept. 6, 1881 |
| 891,441 | Renner | June 3, 1908 |
| 2,181,578 | Cory | Nov. 28, 1939 |

FOREIGN PATENTS

| Number | Country | Date |
|---|---|---|
| 375,902 | France | May 27, 1907 |
| 425,087 | France | Mar. 28, 1911 |